(12) United States Patent
Huang et al.

(10) Patent No.: US 9,709,190 B2
(45) Date of Patent: Jul. 18, 2017

(54) HEIGHT ADJUSTING MECHANISM FOR AN INLET VALVE

(71) Applicant: XIAMEN R&T PLUMBING TECHNOLOGY CO., LTD., Xiamen (CN)

(72) Inventors: Guiyang Huang, Xiamen (CN); Zhijun Zhong, Xiamen (CN); Bing Wang, Xiamen (CN)

(73) Assignee: XIAMEN R&T PLUMBING TECHNOLOGY CO., LTD., Xiamen (CN)

( * ) Notice: Subject to any disclaimer, the term of this patent is extended or adjusted under 35 U.S.C. 154(b) by 262 days.

(21) Appl. No.: 13/786,824

(22) Filed: Mar. 6, 2013

(65) Prior Publication Data

US 2014/0124047 A1    May 8, 2014

(30) Foreign Application Priority Data

Nov. 8, 2012    (CN) .......................... 2012 1 0444044

(51) Int. Cl.
| | |
|---|---|
| *F16K 31/18* | (2006.01) |
| *F16K 51/00* | (2006.01) |
| *F16K 31/20* | (2006.01) |
| *F16K 21/18* | (2006.01) |
| *E03D 1/32* | (2006.01) |

(52) U.S. Cl.
CPC ................ *F16K 51/00* (2013.01); *E03D 1/32* (2013.01); *F16K 21/18* (2013.01); *F16K 31/20* (2013.01); *Y10T 137/598* (2015.04)

(58) Field of Classification Search
CPC .......... F16K 31/26; F16K 21/18; F16K 31/34; F16K 51/00; E03D 1/14; E03D 1/32; Y10T 137/598
USPC ...... 137/426, 444; 251/234; 403/322.4, 327, 403/109.1, 109.2, 109.5
See application file for complete search history.

(56) References Cited

U.S. PATENT DOCUMENTS

| | | | | |
|---|---|---|---|---|
| 4,182,364 | A * | 1/1980 | Gilbert et al. ................. | 137/426 |
| 4,286,619 | A * | 9/1981 | Straus ............................ | 137/426 |
| 4,943,181 | A * | 7/1990 | Murphy ......................... | 403/324 |
| 4,945,944 | A * | 8/1990 | Chen ............................. | 137/403 |
| 5,255,703 | A * | 10/1993 | Johnson ........................ | 137/428 |
| 5,287,882 | A * | 2/1994 | Mikol ............................ | 137/410 |
| 5,715,859 | A * | 2/1998 | Nichols-Roy ................ | 137/426 |
| 6,047,725 | A * | 4/2000 | Gish et al. .................... | 137/426 |
| 6,659,125 | B1 * | 12/2003 | Autunez ....................... | 137/426 |

(Continued)

FOREIGN PATENT DOCUMENTS

CN            2320682 Y        5/1999

*Primary Examiner* — Umashankar Venkatesan
(74) *Attorney, Agent, or Firm* — Rabin & Berdo, P.C.

(57) ABSTRACT

A height adjusting mechanism for an inlet valve includes a valve body, and inlet pipe, a retaining member and an actuator. The inlet pipe is sleeved in the valve body and connected to the valve body; the retaining member is assembled in the valve body; and the actuator can drive the retaining member to move to make the valve body fixed to the inlet pipe or moved relatively to the inlet pipe in the axial direction. The actuator drives the retaining member to move in order to let the valve body and the inlet pipe to be fixed or moved relatively to each other in the axial direction. There is no need to rotate the valve body during adjusting process, and the float won't affect the tank wall when the water valve body is rotating.

15 Claims, 16 Drawing Sheets

(56) References Cited

U.S. PATENT DOCUMENTS

| | | | |
|---|---|---|---|
| 6,837,264 B1* | 1/2005 | Schuster | 137/434 |
| 7,028,704 B2* | 4/2006 | Taylor et al. | 137/414 |
| 2003/0213053 A1* | 11/2003 | Huang | 4/353 |
| 2004/0118456 A1* | 6/2004 | Vegliante | 137/426 |
| 2005/0071913 A1* | 4/2005 | Shaw | 4/366 |
| 2005/0121079 A1* | 6/2005 | Huang | 137/425 |
| 2007/0204393 A1* | 9/2007 | Martin | E03D 1/304 4/405 |
| 2008/0163413 A1* | 7/2008 | Shaw | 4/366 |
| 2009/0199911 A1* | 8/2009 | Schuster et al. | 137/426 |
| 2013/0074953 A1* | 3/2013 | Huang | 137/409 |

* cited by examiner

HEIGHT ADJUSTING MECHANISM FOR AN INLET VALVE

FIELD OF THE INVENTION

The present invention relates to an inlet valve, more specifically, it relates to a height adjusting mechanism for an inlet valve.

BACKGROUND OF THE INVENTION

The conventional inlet valve with height adjustable comprises an inlet pipe, a valve body and a location piece. The inlet pipe is sleeved in and connected to the valve body. The inner teeth on the outer wall of the inlet pipe moves apart or matches with the outer teeth on the inner wall of the valve body resulting in location up or down, and location circumference by the location piece. When adjusting the height, there is a need to unplug the location piece, then rotating the inlet pipe and the valve body relatively. After the inner teeth and the outer teeth are moved apart, move the inlet pipe to a desired height up or down, and stuff it with the location piece. As the location piece is an individual member, it's easy to be missing during the transportation process or the operation process, and the location effect is poor due to that the valve body and the inlet pipe don't attached firmly. During the operation process, user needs to put a hand into the water tank to pull out the location piece, after that, user needs to put a hand into the water tank to adjust the height of the inlet pipe, and then insert the location piece to a desired position. It has more parts, the operation process is complex and it's inconvenient to use.

C.N.Pat.No. 201, 826,373 U discloses a height adjusting mechanism for an inlet valve. Outer teeth are disposed at the outer wall of the inlet pipe, a lock ring is sleeved in the lower end of the valve body, an inner tooth in the inner wall of the lock ring is matched with the outer teeth, and an elastic lock head is arranged on the outer wall of the lock ring, and is elastically locked to the smooth part of the outer wall of the inlet pipe by moving along the lock ring in the radial direction. During the operation process, the lock ring can be avoided missing, but the elastic lock head is arranged under the float, user needs to put a hand into the water tank to hold the valve body, the valve body is rotated when the spring leaf is pressed, the height of the inlet valve is adjusted after the spring leaf is loosened, and the location operation is finished when the valve body is rotated again. The height adjusting mechanism is very inconvenient to operate. Additionally, the float or the sealing cup will work on the wall of the water tank, resulting in that the valve body wouldn't rotate to the right position when it rotates.

SUMMARY OF THE INVENTION

The present invention is provided with a height adjusting mechanism for an inlet valve, which overcomes the disadvantages of the existing technology.

The technical proposal of the present invention to solve the technical problem is:

A height adjusting mechanism for an inlet valve comprising:

A valve body (100);

An inlet pipe (200), which is sleeved in the valve body (100) and connected to the valve body (100);

A retaining member (300), which is assembled to the valve body (100); and

An actuator (400), which can drive the retaining member (300) to move to make the valve body (100) fixed to the inlet pipe (200) or moved relatively to the inlet pipe (200) in the axial direction.

In another preferred embodiment, the actuator (400) can slide up and down in the valve body (100) and is connected to the valve body (100), a driving groove (412) is disposed at the lower end of the actuator (400) to pass through the actuator (400) inside and outside, the retaining member (300) is disposed with a flange (320) coupled to the driving groove (412).

In another preferred embodiment, at least a row of outer teeth (210) of spaced are disposed in the axial direction at the outer periphery of the inlet pipe (200); at least an inner tooth (310) coupled to the outer teeth (210) is disposed at the inner periphery of the valve body (100) or the retaining member (300), the valve body (100) is fixed to the inlet pipe (200) or moved relatively to the inlet pipe (200) by the cooperation of the inner tooth (310) and the outer teeth (210).

In another preferred embodiment, the retaining member (300) is rotatable and disposed in the valve body (100), the inner tooth (310) is disposed at the inner periphery of the retaining member (300), the actuator (400) slides up and down to drive the retaining member (300) to rotate, making the inner tooth (310) and the outer teeth (210) engaged or separated.

In another preferred embodiment, several first bumps (410) are spaced disposed in an annular at the outer periphery of the lower end of the valve body (100), an annular groove (340) is disposed at the inner periphery of the retaining member (300) to couple to the first bumps (140), the retaining member (300) is rotatable and connected to the valve body (100) by the cooperation of the first bumps (140) and the groove (340).

In another preferred embodiment, the retaining member (300) is rotatable and connected to the valve body (100), several first elastic pieces (150) of spaced are disposed in an annular at the lower end of the valve body (100), a first throughout groove (151) is disposed between two adjacent first elastic pieces (150), the inner periphery of the first elastic piece (151) is disposed with the inner tooth (310), the inner periphery of the retaining member (300) is disposed with at least a limited rib (360) to couple to the first elastic piece (150) or the first throughout groove (151), the actuator (400) slides up and down to drive the retaining member (300) to rotate to make the limited rib (360) coupled to the first elastic piece (150) or the first throughout groove (151).

In another preferred embodiment, the outer periphery of the first elastic piece (150) is disposed with two second bumps (152) of spaced up and down, a lock groove (153) is formed between the two second bumps (152), the inner periphery of the retaining member (300) is disposed with a ring shaped bump (361) to couple to the lock groove (153), the retaining member (300) is rotatable and connected to the valve body (100) by the cooperation of the ring shaped bump (361) and the lock groove (153).

In another preferred embodiment, the driving groove (412) includes a lower limited groove (411) parallel to the centre line of the inlet pipe (200) and an inclined groove (413), the lower limited groove (411) is connected to the bottom of the inclined groove (413).

In another preferred embodiment, the retaining member (300) further includes a limited block (330) to prevent the actuator (400) from moving in the axial direction, the limited block (330) is fixed to the flange (320) and situated in the exterior of the driving groove (412).

In another preferred embodiment, the lower end of the valve body (100) is disposed with several second elastic pieces (160) of spaced in an annular, a second throughout groove (161) is formed between two adjacent second elastic pieces (160), the inner periphery of the second elastic piece (160) is disposed with the inner tooth (310), the retaining member (300) slides up and down and is disposed between the valve body (100) and the second elastic piece (160).

In another preferred embodiment, the outer periphery of each second elastic piece (160) is respectively disposed with a third bump (162) to limit the retaining member (300) in the axial direction, the several third bumps (162) are spaced disposed in an annular.

In another preferred embodiment, the outer periphery of the valve body (100) is disposed with a first longitudinal guiding rib (120), two sides of the first guiding rib (120) are respectively disposed with a longitudinal guiding groove (123), the actuator (400) is disposed with a front side and a back side of opposite to each other, the back side is disposed with two ribs (412) of spaced, two ribs are respectively coupled to the two guiding grooves (123).

In another preferred embodiment, the present invention further includes location components movably disposed at the lower end of the actuator (400), the location components include a location button (430) and a first elastic piece (440), the location button (430) is disposed with a location lock (432), the valve body (100) or the first guiding rib (120) is disposed with a location groove (121) coupled to the location lock (432), a throughout hole (414) is disposed at the upper end of the actuator (400) for the location lock (432) to pass through, the first elastic piece (440) is withstood between the location button (430) and the actuator (400). Compared to the existing technology, the present invention has advantages as below:

1. The actuator drives the retaining member to move in order to let the valve body and the inlet pipe to be fixed or moved relatively to each other in the axial direction. There is no need to rotate the valve body during adjusting process, and the float won't affect the tank wall when the water valve body is rotating. And the adjusting is more convenient as user doesn't need to put a hand into the water tank to rotate the valve body. Additionally, it's a saving of time and effort with high adjusting efficiency.

2. The valve body and the inlet pipe can be fixed or moved relatively to each other in axial direction by the cooperation of the inner teeth and the outer teeth. It cost low with simple structure.

3. The actuator slides up and down in the valve body and is connected to the valve body; the actuator is connected to the retaining member in a transmission way by the cooperation of the driving groove and the flange. The way the actuator works is easier to operate and it accords with hand habit. Additionally, the inlet valve could be more compact.

4. The retaining member is rotatable in the valve body and connected to the valve body. The actuator moves up and down so as to drive the retaining member to rotate, making the inner teeth matches with the outer teeth or moves apart the outer teeth correspondingly. The structure is more suitable for smaller radial space tank, and it exhibits high compatibility.

5. The retaining member is rotatable in the valve body and connected to the valve body. The actuator moves up and down so as to conduct the retaining member to rotate, making the inner teeth to match with the outer teeth or moved apart with the outer teeth correspondingly. The structure is more suitable for smaller radial space tank, and it exhibits high compatibility.

6. The actuator moves up and down so as to conduct the retaining member to be installed up and down between the valve body and the second elastic piece. The structure is more suitable for smaller radial space tank, and it exhibits high compatibility.

7. The actuator is rod shaped and it passes through the float, the upper end of the actuator is disposed on the top of the float. There is only need to move the upper end of the actuator to make the retaining member moved when adjusting the height of the inlet valve. User doesn't need to put a hand into the water tank, it is particularly suitable for the tank of small cross-sectional area, and the compatibility is improved.

8. The upper end of the actuator and the valve body can be positioned in axial direction by the cooperation of the location lock and the location groove. The location lock moves out of the location groove in the role of the first elastic piece when pressing the location button, and the actuator moves so as to conduct the retaining member to work. The structure is simple, and it's cost-effective and easy adjusting.

9. A second elastic piece is disposed between the actuator and the valve body to make the actuator repositioned; the structure of the inlet valve is simpler, and the inlet valve has fewer members with lower cost.

BRIEF DESCRIPTION OF THE DRAWINGS

The present invention will be further descried with the drawings and the embodiments.

DETAILED DESCRIPTION OF THE EMBODIMENTS

Figure 1:
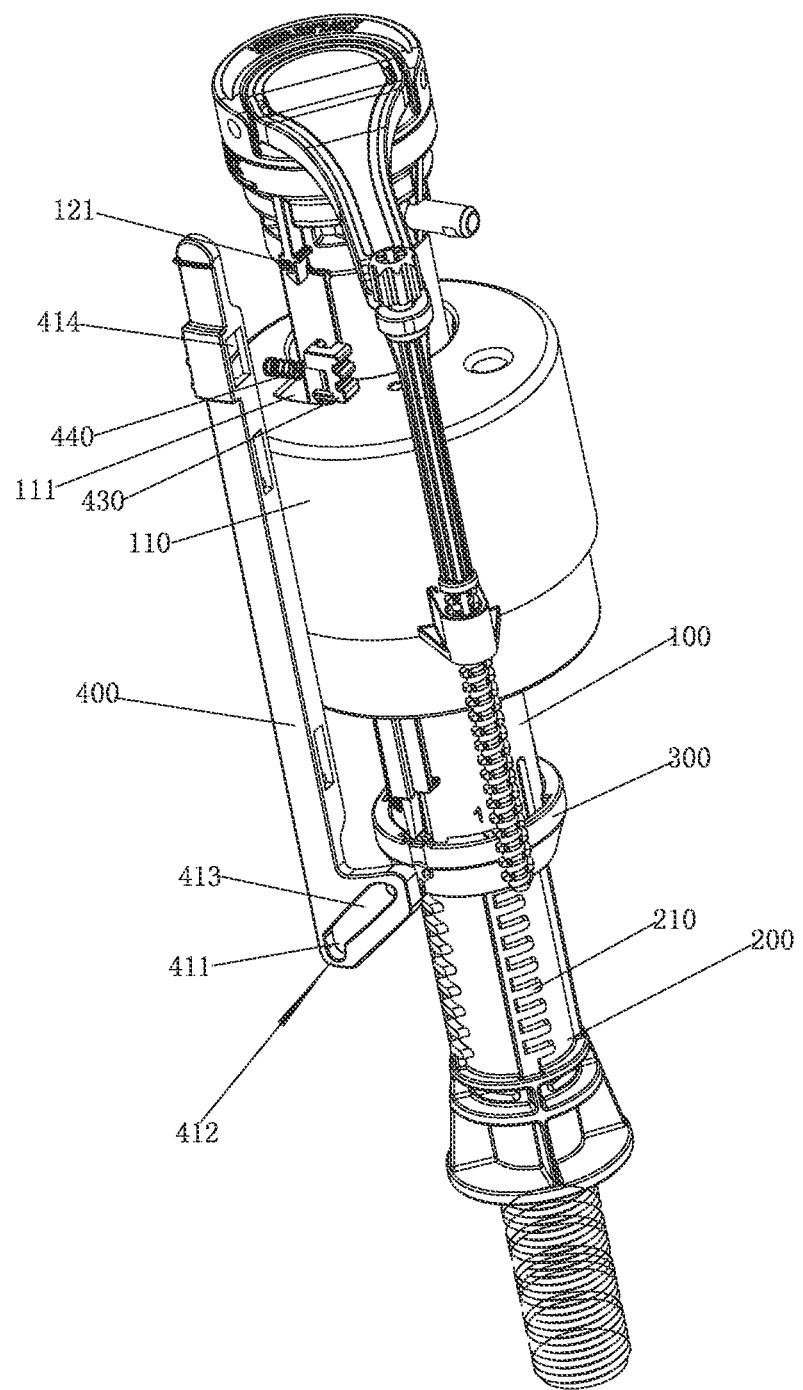
FIG. 1 illustrates the breakdown structure of the first embodiment of the height adjusting mechanism for an inlet valve.
Figure 2:
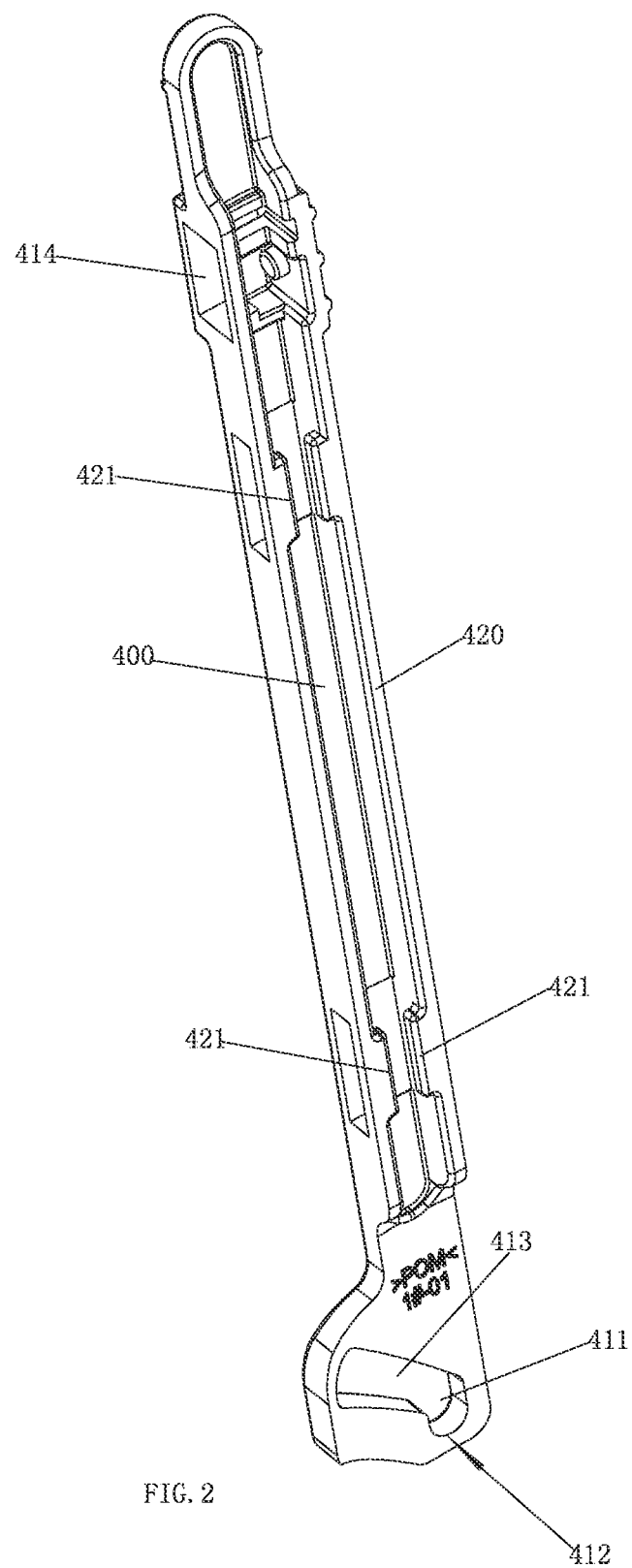
FIG. 2 illustrates the back view of the first embodiment of the actuator of the height adjusting mechanism for an inlet valve.
Figure 3:
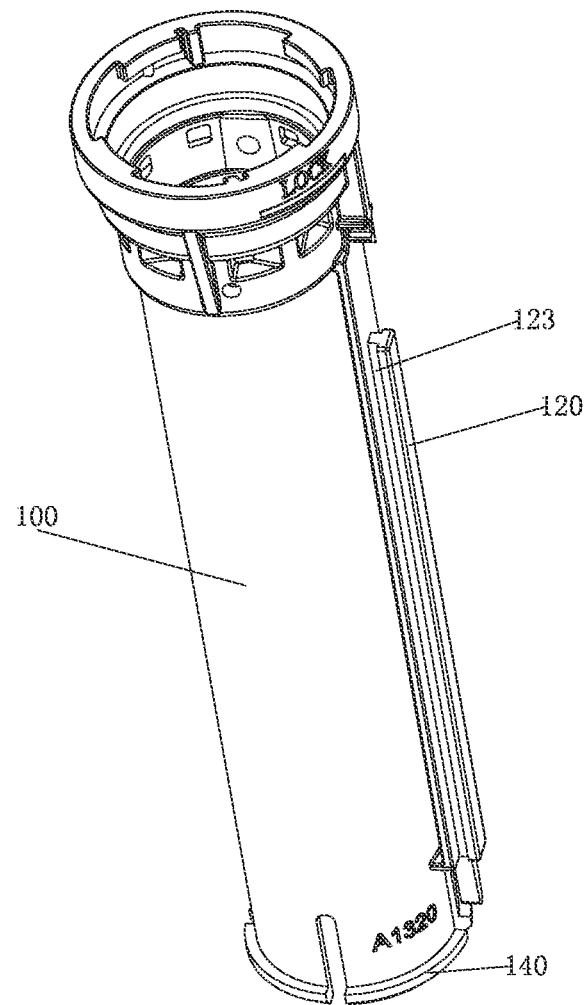
FIG. 3 illustrates the structure of the first embodiment of the valve body of the height adjusting mechanism for an inlet valve.
Figure 4:
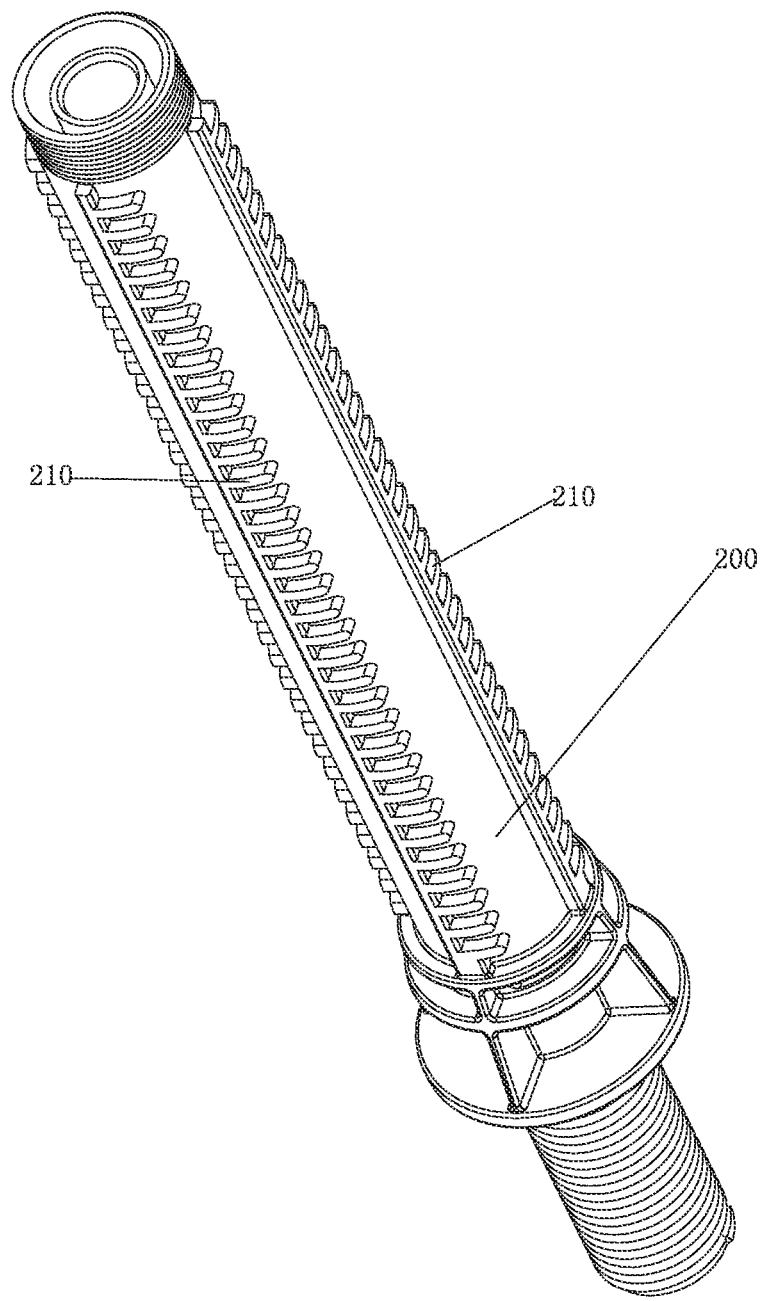
FIG. 4 illustrates the structure of the first embodiment of the inlet pipe of the height adjusting mechanism for an inlet valve.
Figure 5:
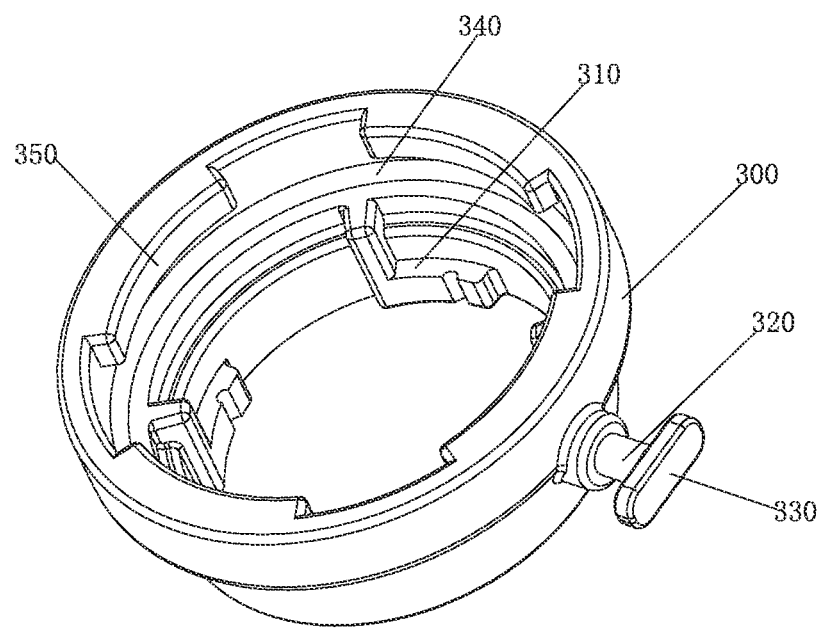
FIG. 5 illustrates the structure of the first embodiment of the retaining member of the height adjusting mechanism for an inlet valve.
Figure 6:
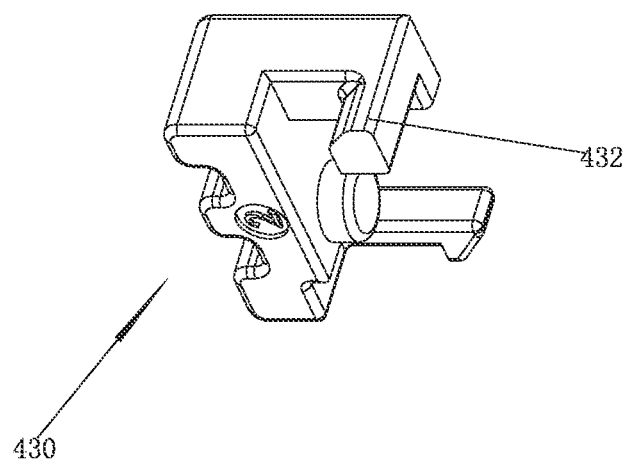
FIG. 6 illustrates the structure of the first embodiment of the location button of the height adjusting mechanism for an inlet valve.
Figure 7:
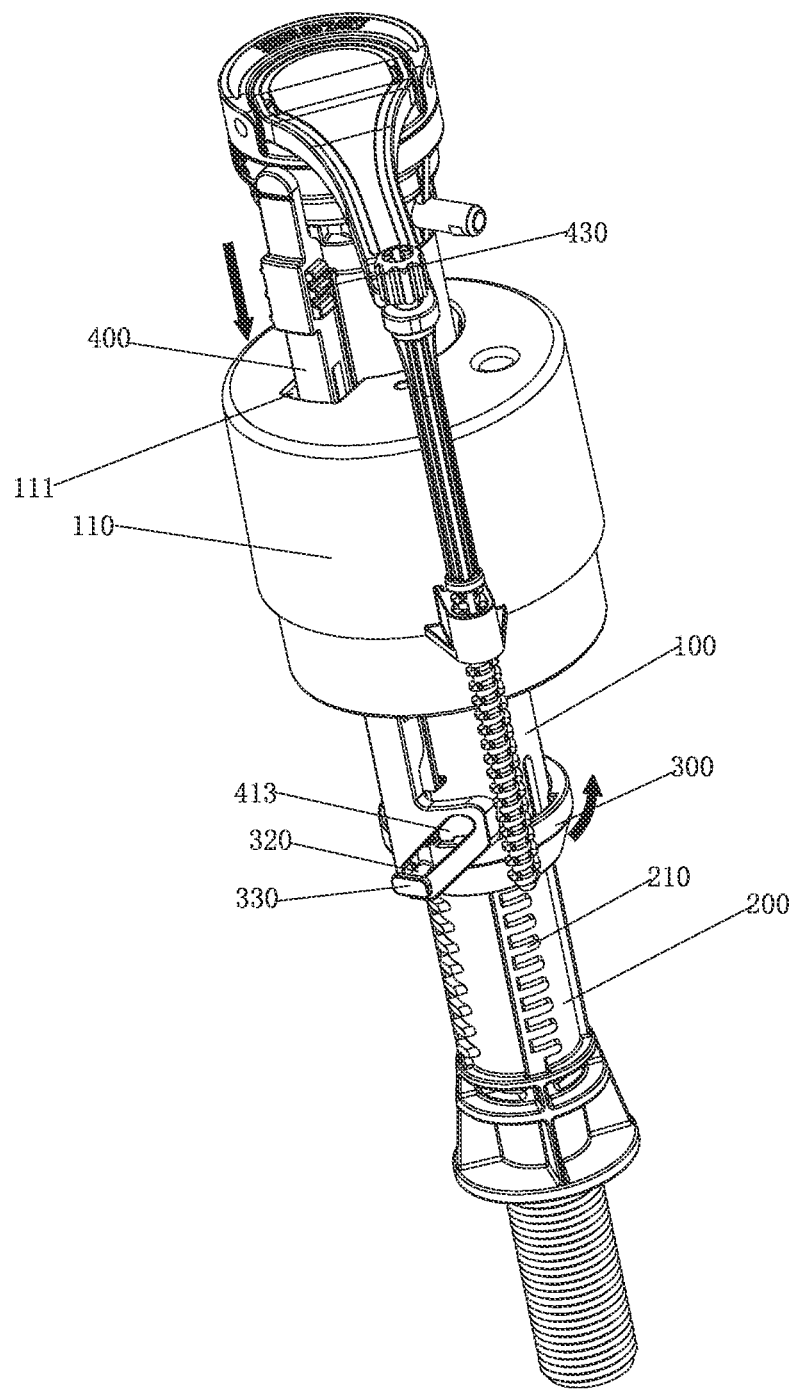
FIG. 7 illustrates the first using state view of the first embodiment of the height adjusting mechanism for an inlet valve.
Figure 8:
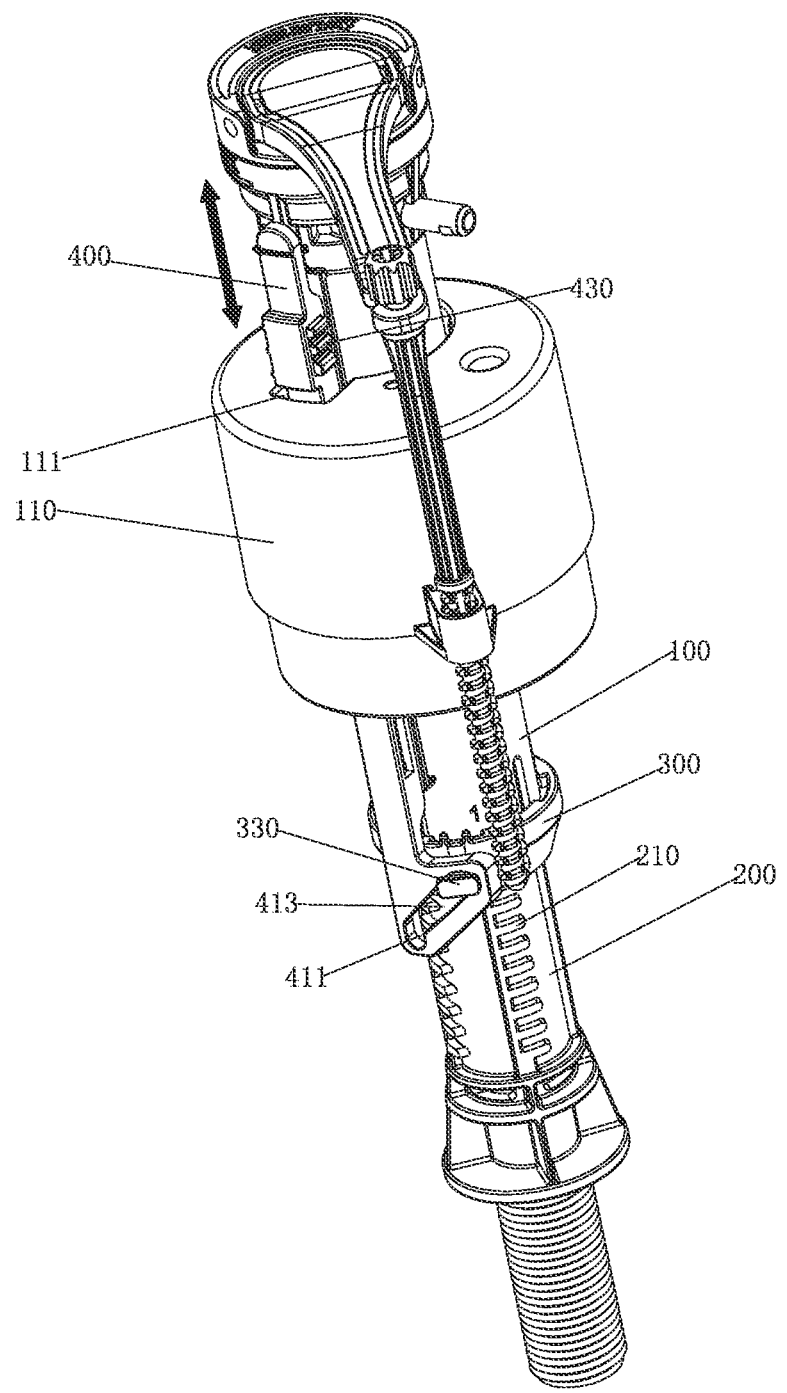
FIG. 8 illustrates the second using state view of the first embodiment of the height adjusting mechanism for an inlet valve.
Figure 9:
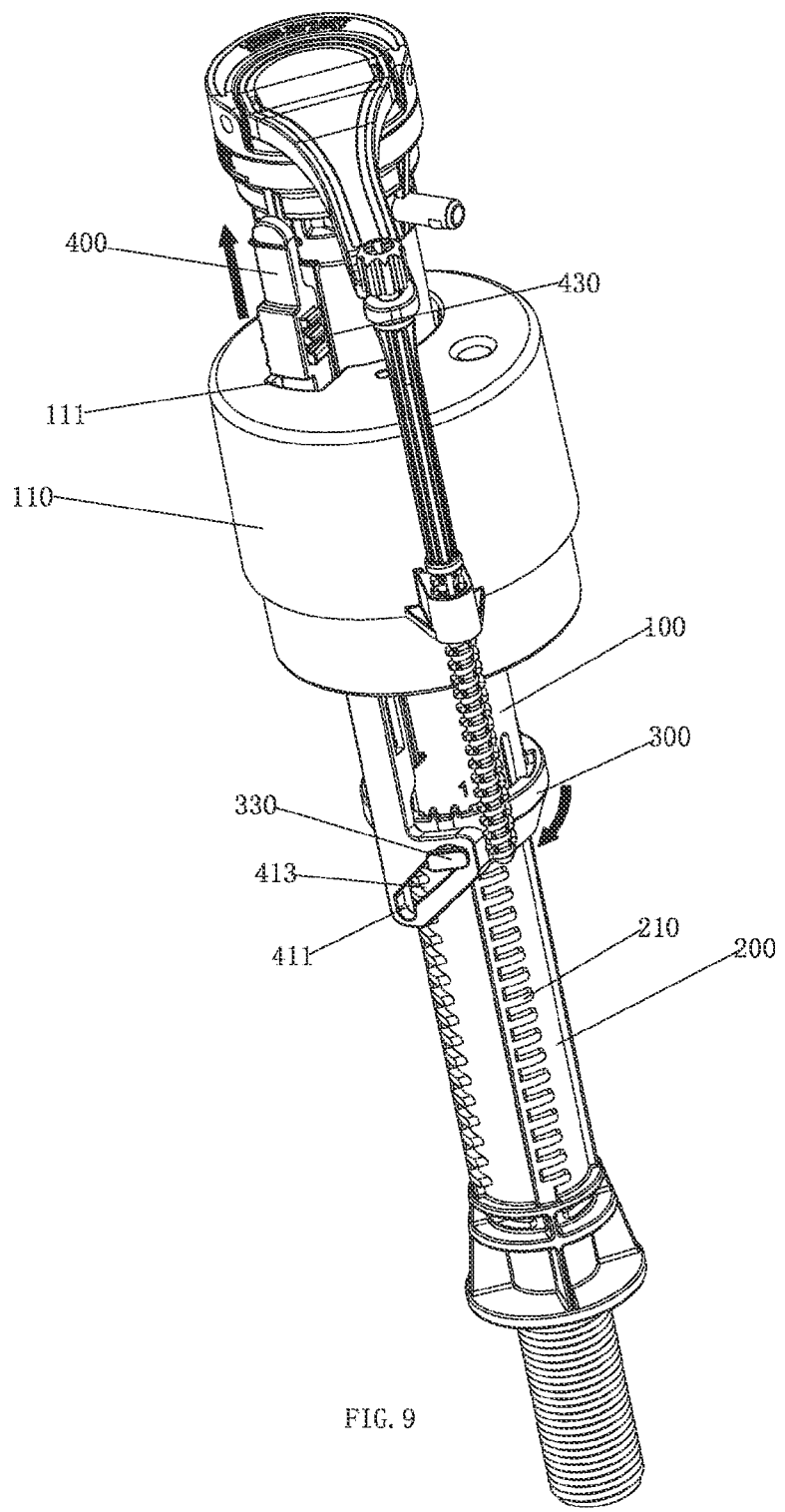
FIG. 9 illustrates the third using state view of the first embodiment of the height adjusting mechanism for an inlet valve.
Figure 10:
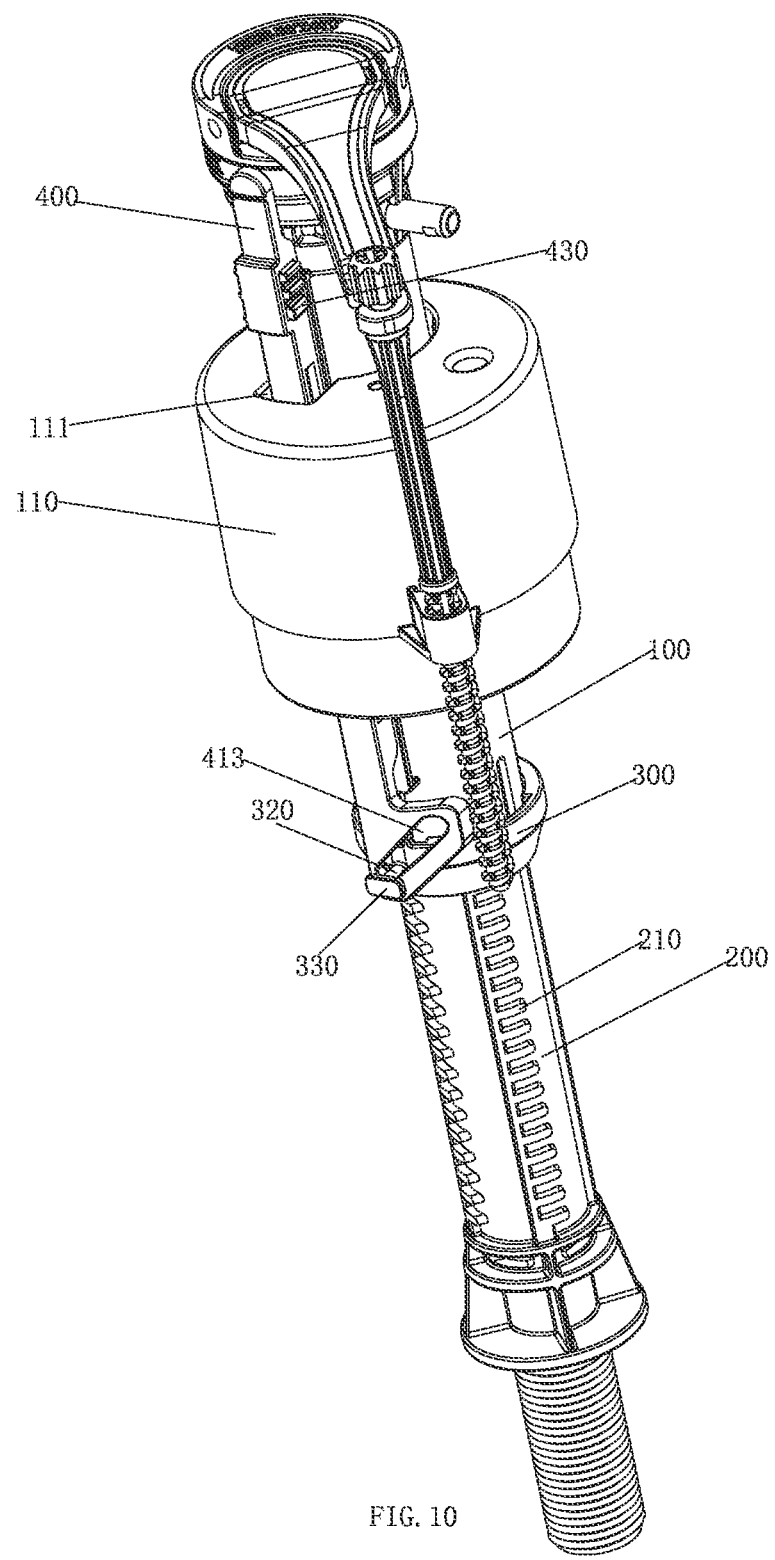
FIG. 10 illustrates the fourth using state view of the first embodiment of the height adjusting mechanism for an inlet valve.

Refer to the FIG. 1 to FIG. 10 of the first embodiment of a height adjusting mechanism for an inlet valve. It comprises a valve body 100, an inlet pipe 200, a retaining member 300 and an actuator 400.

In the embodiment, there are several first bumps 140 of spaced disposed in an annular at the bottom end of the outer periphery of the valve body 100. In this embodiment, a longitudinal first rib 120 is disposed at the periphery of the valve body 100. A longitudinal guide lock groove 123 is respectively disposed at every side of the first rib 120. A location groove 121 is disposed in the valve body 100.

The inlet pipe 200 is sleeved in and connected to the valve body 100. In this embodiment, at least one row of outer teeth 210 of spaced are disposed axially at the outer periphery of the inlet pipe 200. In the embodiment, there are four rows of outer teeth 210 of spaced disposed in the circumferential direction at the outer periphery of the water inlet pipe 200.

The retaining member 300 is installed in the valve body 100. In this embodiment, a flange 320 is disposed in the retaining member 300. In this embodiment, there is at least one row of inner teeth 310 which could be matched with the outer teeth 210. The valve body 100 and the inlet pipe 200 can be relatively fixed to each other or relatively moved apart in axial direction by the cooperation of the inner teeth 310 and the outer teeth 210. It's cost low with simple structure. Additionally, the retaining member 300 is rotatable in the valve body 100, the actuator 400 moves up and down so as to conduct the retaining member 300 to rotate to make the inner teeth 310 matched with the outer teeth 210 or moved apart with the outer teeth 210. The structure is more suitable for smaller radial space tank, and it exhibits high compatibility. In this embodiment, an annular groove 340 is disposed at the inner periphery of the retaining member 300, the annular groove 340 is annular and it is matched with the first bump 140. The retaining member 300 is rotatable and connected to the valve body 100 by the cooperation of the first bump 140 and the groove 340.

In the embodiment, the inner teeth are in L shape and have four; the inner teeth are shaped disposed in circumferential direction at the inner periphery of the retaining member 300. The distance of two adjacent outer teeth 210 is greater than the circumferential distance of the inner teeth 310.

In this embodiment, a limited block 330 is disposed in the retaining member 300; the limited block 330 is fixed to the flange 320. In this embodiment, there are several second bumps 352 at the inner periphery of the retaining member 300, the second bumps 152 are spaced disposed in an annular. The groove 340 is disposed between the second bumps 352 and the inner teeth 310. The first bump 140 can be positioned in axial direction by the cooperation of the second bump 350 and inner teeth 310.

The actuator 400 drives the retaining member 300 to move in order to let the valve body 100 and the inlet pipe 200 to be fixed to each other or moved relatively to each other in axial direction. The actuator 400 is movably connected to the inlet valve 100, for example, in the inlet valve 100 or except the place where be fixed to the inlet valve, and the actuator 400 is connected to the retaining member 300 in transmission way. In this embodiment, the actuator 400 slides up and down and is connected to the valve body 100. The way the actuator works is easier to operate and it accords with the hand habit. Additionally, the inlet valve could be more compact. A driving groove 412 running through the actuator 400 inside and outside is disposed at the bottom end of the actuator 400. A flange 320 is disposed on the retaining member 300 and capable of matching with the driving groove 412. The driving groove 412 is disposed inside the limited block 330, the limited block 330 can limit the actuator 400 to move apart with the retaining member 300 in the axial direction.

In this embodiment, the driving groove 412 includes an inclined groove 413 and a lower limited groove 411 parallel to the centre line of the inlet pipe 200. The lower limited groove 411 is connected to the bottom of the inclined groove 413. Additionally, the rotation distance of the flange 320 moves from the lower limited groove 411 to the top of the inclined groove 413 to conduct the retaining member 300 to rotate is the same with the distance that the inner teeth matches with the outer teeth to moves apart with the outer teeth.

In this embodiment, the actuator 400 is rod shaped, and the actuator 400 has a front side and a back side opposite to each other. There are two ribs 421 of spaced at the back side of the actuator 400, the ribs 421 are spaced disposed to couple to the two guide lock grooves 123, the ribs 421 are disposed inside of the longitudinal ribs 420. In this embodiment, there is a throughout hole 414 at the upper end of the actuator 400, the location lock 432 can pass through the throughout hole 414.

In this embodiment, the height adjusting mechanism for an inlet valve comprises location components; the location components are movably connected to the upper end of the actuator 400. The location components include a location button 430 and a first elastic piece 440. A location lock 432 is disposed on the location button 430 to couple to the location groove 121. The first elastic piece 440 is withstood between the location button 430 and the actuator 400.

In this embodiment, the height adjusting mechanism for an inlet valve further comprises a float 110 movably mounted to the valve body 100. There is an abdicating groove 111 respectively disposed at both the top and the bottom of the float 110 for the actuator 400 to move. The actuator 400 passes through the abdicating groove 111, the upper end of the actuator 400 is on the top of the float 110. There is only need to move the upper end of the actuator 400 to drive the retaining member to move when adjusting the height of the inlet valve. User doesn't need to put a hand into the water tank, particularly be suitable for the tank of small cross-sectional area, and the compatibility is improved.

The working principle is as below:

When in initial state, the location lock 432 is locked to the location groove 121, the flange 320 is disposed at the lower limited groove 411. As can be seen from FIG. 7, when to adjust the height of the inlet valve, the location lock 432 moves out of the location groove 121 when the location lock 432 is pressed, then the actuator 400 is moved down to conduct the retaining member 300 to rotate counterclockwise. As can be seen from FIG. 8, the flange 320 moves from the lower limited groove 411 to the top of the inclined groove 413, it's the staggered state when the inner teeth 310 and the outer teeth 210 are separated, by moving the valve body 100 up and down, a desired height can be achieved. As can be seen from FIG. 9, pull up the actuator 400 to conduct the retaining member 300 to rotate clockwise. As can be seen from FIG. 10, the flange 320 moves from the top of the inclined groove 413 to the lower limited groove 411, it's the time when the inner teeth 310 and the outer teeth 210 are engaged, the location lock 432 is locked to the location groove 121 when the height adjusting process for an inlet valve is completed.

There is no need to rotate the valve body during the adjusting process, so that the float won't affect the tank wall when the valve body is rotating. And the adjusting is more convenient as user doesn't need to put a hand into the water tank to rotate the valve body. Additionally, it's an effective way to save time and effort, and it achieves a high adjusting efficiency. The structure is more suitable for smaller radial space tank, and it exhibits high compatibility.

Figure 11:
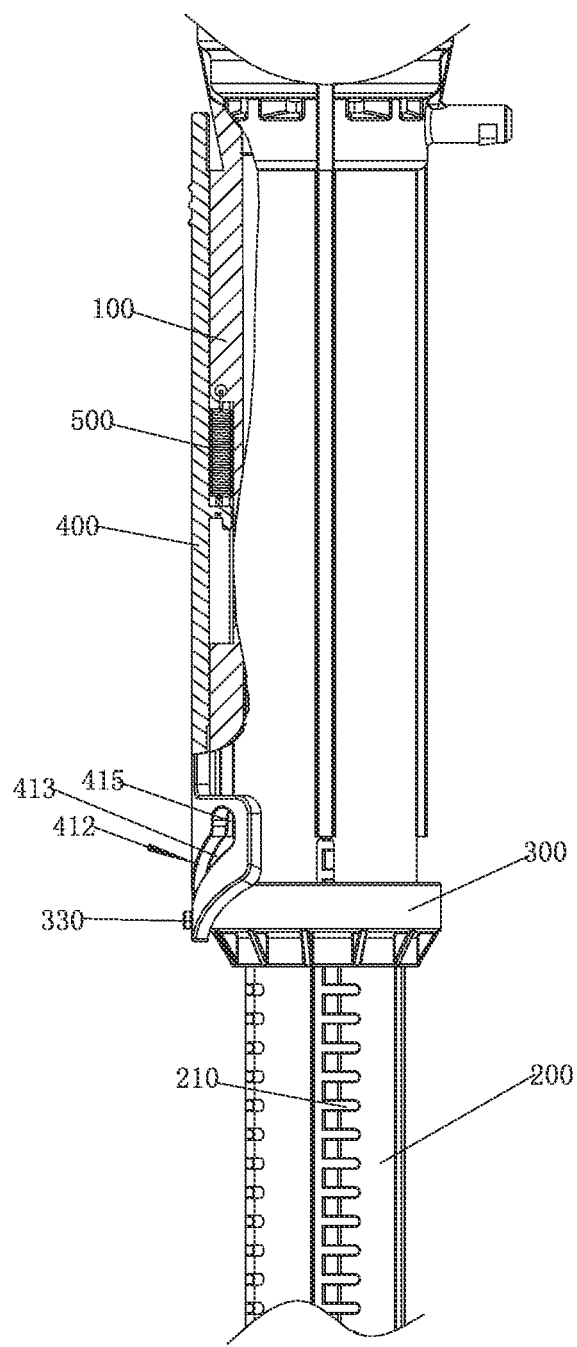
FIG. 11 illustrates partial sectional view of the second embodiment of the height adjusting mechanism for an inlet valve.

FIG. 11 shows a second embodiment of a height adjusting mechanism for an inlet valve. The differences from the first embodiment are as follows:

In this embodiment, there is no location component disposed in the inlet valve, but a second elastic piece 500 is disposed between the actuator 400 and the valve body 100, the second elastic piece 500 is disposed to reset the actuator 400. One end of the second elastic piece 500 is fixed to the valve body 100, while the other is fixed to the actuator 400. As the second elastic piece 500 is disposed between the actuator 400 and the valve body 100, the structure of the inlet valve is simpler; also the inlet valve has few members and is lower cost.

In this embodiment, the driving groove 412 includes an inclined groove 413, an upper limited groove 415 and a lower limited groove 411 parallel to the centre line of the inlet pipe 200. The lower limited groove 411 is connected to the bottom of the inclined groove 413. The top of the upper limited groove 415 is connected to the inclined groove 413. The rotation distance the flange 320 moves from the lower limited groove 411 to the upper limited groove 415 through the inclined groove 413 is just the same as the distance that the inner teeth 310 and the outer teeth 210 moves from be matched to be apart.

When in initial state, the flange 320 is disposed at the lower limited groove 411. There is only need to move down the actuator 400 to conduct the retaining member 300 to rotate counterclockwise when adjusting the inlet valve height. The flange 320 moves from the lower limited groove 411 to the top of upper limited groove 415 through the inclined groove 413, it's the staggered state when the inner teeth 310 and the outer teeth 210 are separated, and the second elastic piece 500 is in a resilient state. Then move the valve body 100 up and down to a desired height and keep the actuator 400 be pressed. Since the valve body 100 moves to a desired height, the flange 320 moves from the upper limited groove 415 to the lower limited groove 411 through the inclined groove 413 when the actuator 400 is released. Under the circumstance, the inner teeth 310 and the outer teeth 210 are engaged to each other; also the height adjusting process is completed.

Figure 12:
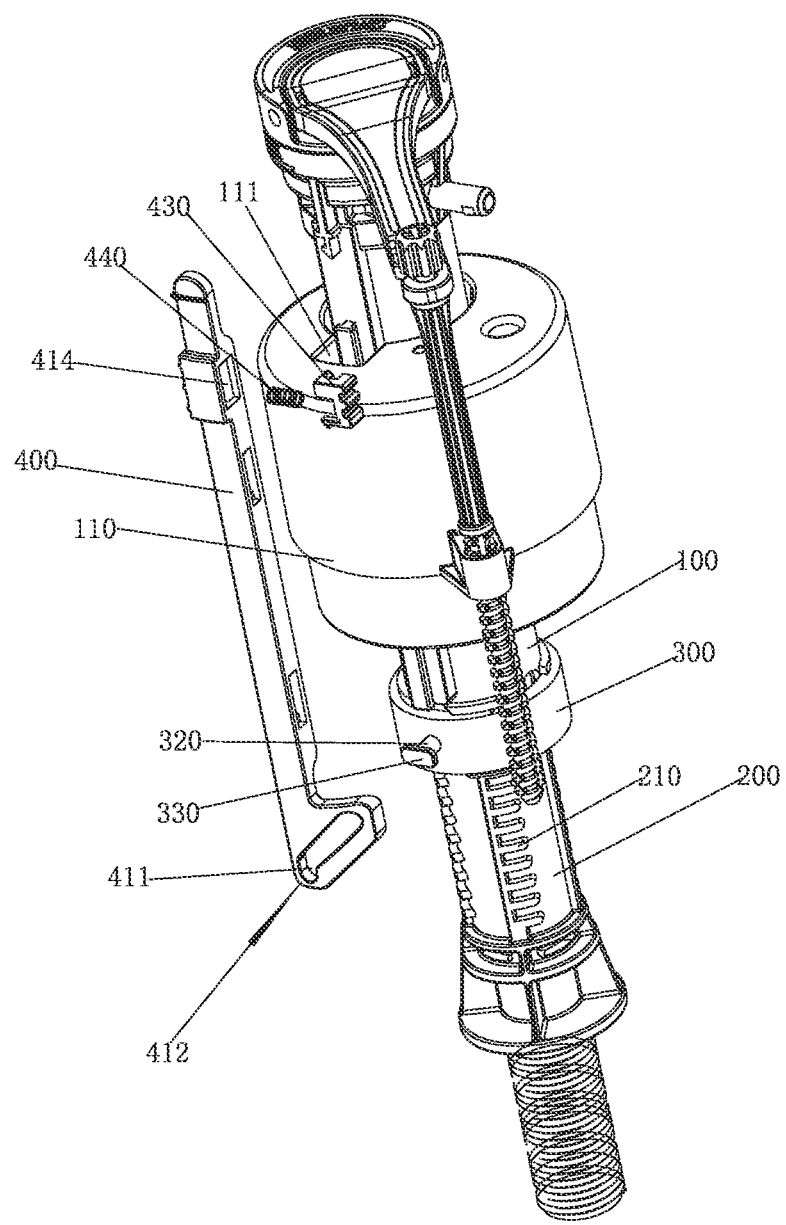
FIG. 12 illustrates the breakdown structure of the third embodiment of the height adjusting mechanism for an inlet valve.
Figure 13:
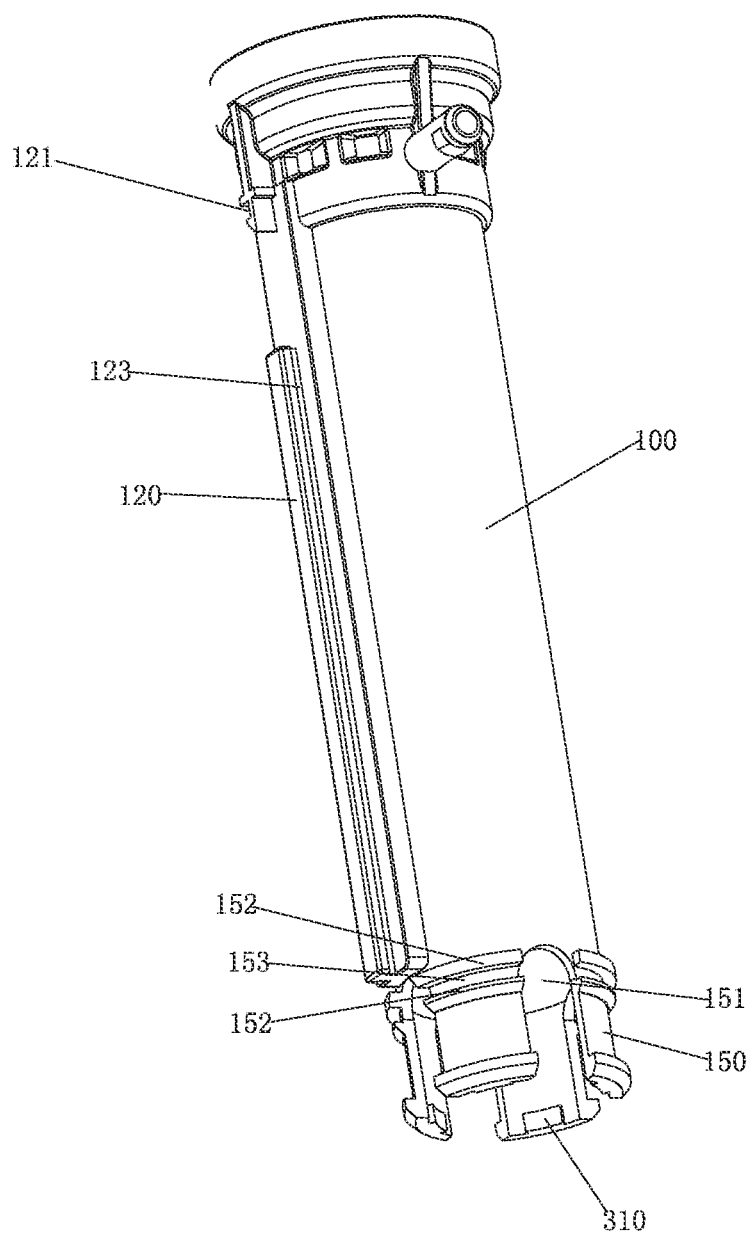
FIG. 13 illustrates the structure of the third embodiment of the valve body of the height adjusting mechanism for an inlet valve.
Figure 14:
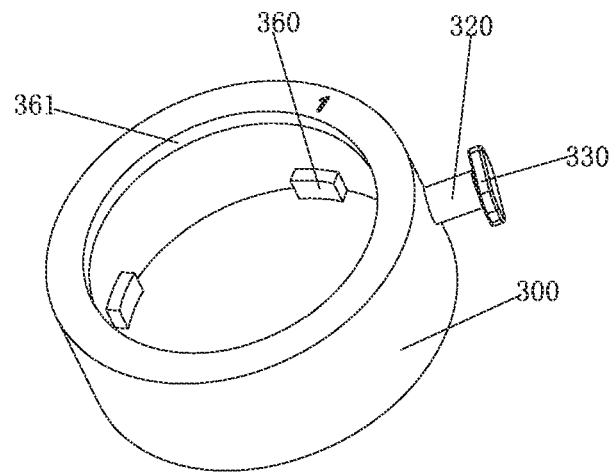
FIG. 14 illustrates the structure of the third embodiment of the retaining member of the height adjusting mechanism for an inlet valve.
Figure 15:
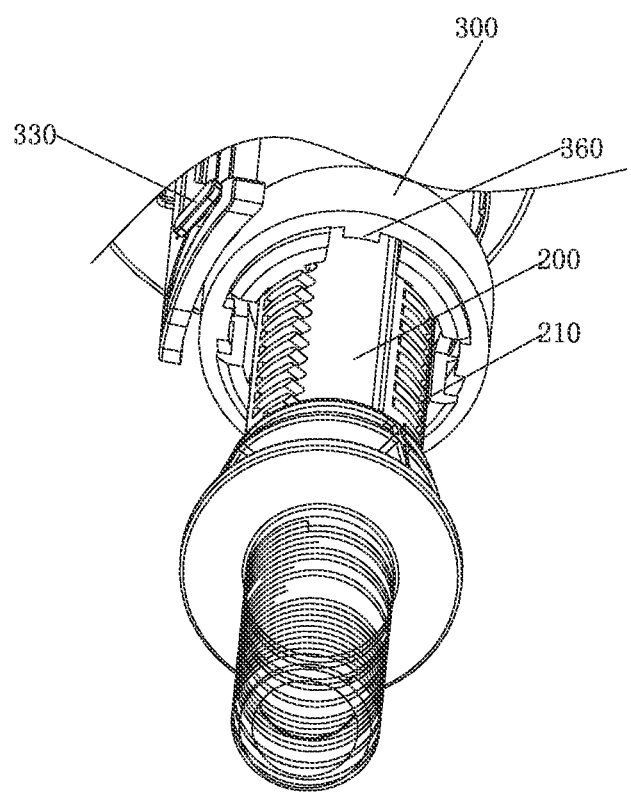
FIG. 15 illustrates assembly diagram of the third embodiment of the retaining member and the inlet pipe of the height adjusting mechanism for an inlet valve.

Please refer to the FIG. 12 to the FIG. 15 of the third embodiment of the height adjusting mechanism for an inlet valve; the difference from the first embodiment is as below:

In this embodiment, the retaining member 300 is rotatable and assembled in the valve body 100. There are several first elastic pieces 150 of spaced disposed at the bottom end of the valve body 100 in an annular. A first throughout groove 151 is disposed between two adjacent first elastic pieces 150. There is at least a limited rib 360 at the inner periphery of the first elastic piece 150, the limited rib 360 is matched with the first elastic piece 150 or the first throughout groove 151. The actuator 400 moves up and down so as to conduct the retaining member 300 to rotate to make the inner teeth 310 engaged with the outer teeth 210 or moved apart with the outer teeth 210. The limited rib 360 can be engaged with the first elastic piece 150 or the first throughout groove 151.

In this embodiment, there are two second bumps 152 at the outer periphery of the first elastic piece 150, the second bumps 152 are spaced disposed up and down. A lock groove 153 is disposed between the two second bumps 152. An annular bump 361 is disposed at the inner periphery of the retaining member 300 and it can be matched with the lock groove 153. The retaining member 300 is rotatable and connected to the valve body 100 by the cooperation of the annular bump 361 and the lock groove 153.

The working principle of the embodiment is as below:

When in initial state, a location lock 432 is locked to the location groove 121, the flange 320 is disposed at the lower limited groove 411. The limited rib 360 is withstood the outer periphery of the first elastic piece 150.

When to adjust the inlet valve height, the location lock 432 moves out of the location groove 121 when the location button 430 is pressed, then the actuator 400 moves down to conduct the retaining member 300 to rotate counterclockwise. The flange 320 moves from the lower limited groove 411 to the top of the inclined groove 413, the limited rib 360 moves from the outer periphery of the first elastic piece 150 to the first throughout groove 151. As can be seen from FIG. 15, the first elastic piece 150 gets out of the control of the limited rib 360, though the inner teeth 310 and the outer teeth 210 are in a meshing state, the inner teeth 310 and the outer teeth 210 would move apart because of the elastic action of the first elastic piece 150; then the valve body can be moved up and down to the desired height. Pull up the actuator 400 to conduct the retaining member 300 to rotate clockwise. The flange 320 moves from the top of the inclined groove 413 to the lower limited groove 411, the limited rib 360 moves from the first throughout groove 151 to the outer periphery of the first elastic piece 150, preventing the first elastic piece 150 deformed outwards, and the inner teeth 310 and the outer teeth 210 are in a meshing state, the location lock 432 is locked to the groove 121. The height adjusting process is completed.

The structure is more suitable for smaller radial space tank, and it exhibits high compatibility.

Figure 16:
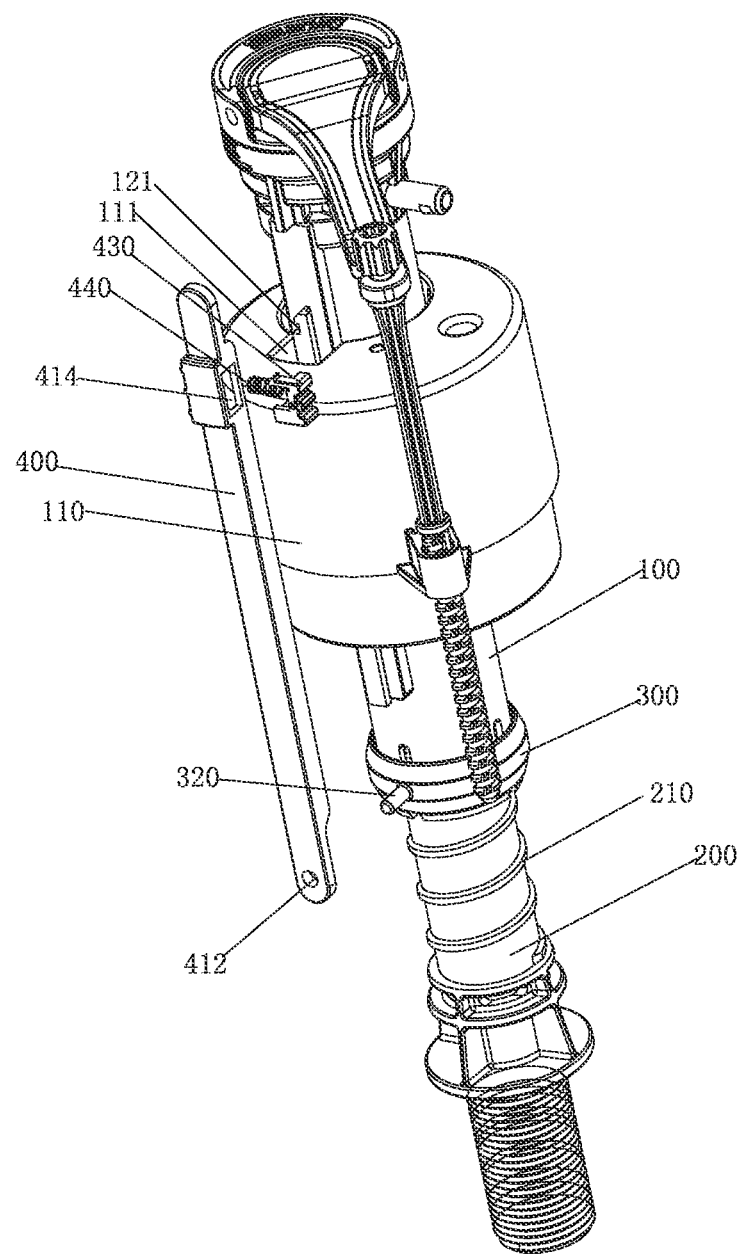
FIG. 16 illustrates breakdown structure of the fourth embodiment of the height adjusting mechanism for an inlet valve.
Figure 17:
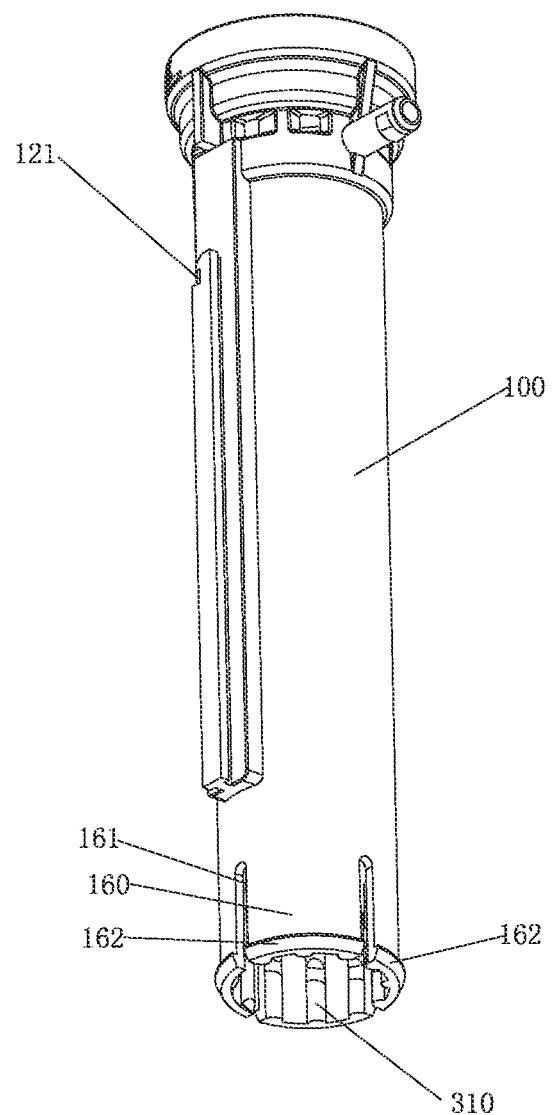
FIG. 17 illustrates the structure of the fourth embodiment of the valve body of the height adjusting mechanism for an inlet valve.
Figure 18:
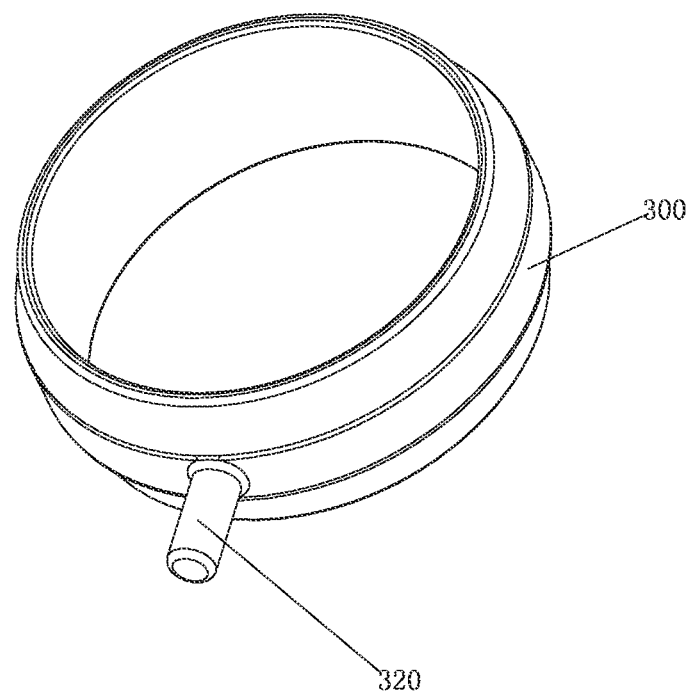
FIG. 18 illustrates the structure of the fourth embodiment of the retaining member of the valve body of the height adjusting mechanism for an inlet valve.

Refer to the FIG. 16 to FIG. 18 of the fourth embodiment of the height adjusting mechanism for an inlet valve. The difference from the first embodiment is as below:

In this embodiment, there are several second elastic pieces 160, which are spaced disposed in an annular at the bottom end of the valve body 100. A second throughout groove 161 is disposed between the two adjacent second elastic pieces 160. The inner teeth 310 are disposed at the inner periphery of the second elastic piece 160. The retaining member 300 slides up and down and is connected between the valve body 100 and second elastic piece 160.

In this embodiment, a third bump 162 is respectively disposed at every periphery of the second elastic piece 160, the third bump 162 can limit the retaining member 300 in axial direction. All the third bumps 162 are spaced disposed in an annular.

In this embodiment, the driving groove 412 is an aperture matched with the flange firmly. The location groove 121 is mounted on the top of the first limited rib 120.

The working principle of this embodiment is as below:

When in initial state, the location lock 432 is locked to the location groove 121, the retaining member 300 is disposed at the periphery of the second elastic piece 160 and withstood the third bump 162. When to adjust the inlet valve height, the location lock 432 moves out of the location groove 121 when the location lock 432 is pressed, and the actuator 400 is pulled up to conduct the retaining member 300 to move up. Then the retaining member 300 moves from the periphery of the second elastic piece 160 to the periphery of the valve body, then the second elastic piece 160 gets out of the control of the retaining member 300, though the inner teeth 310 and the outer teeth 210 are in a meshing state, the inner teeth 310 and the outer teeth 210 would move apart because of the elastic action of the first elastic piece 150, then the valve body is moved up and down to the desired height. Then the actuator 400 is pulled down to conduct the retaining member 300 to move up, making the retaining member 300 moved from the periphery of the valve body 100 to the periphery of the second elastic piece 160 to prevent the second elastic piece 160 getting deformed outwards. And the inner teeth 310 and the outer teeth 210 are in a meshing state, the location lock 432 is locked to the location groove 121. The height adjusting process is completed. The structure is more suitable for smaller radial space tank, and it exhibits high compatibility.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

What is claimed is:

1. A height adjusting mechanism for an inlet valve comprising:
   A valve body;
   An inlet pipe, which is sleeved in the valve body and connected to the valve body;
   A retaining member, is assembled to the valve body; and
   An actuator, which can drive the retaining member to move between a first position and a second position, when in the first position, the retaining member makes the inlet pipe and the valve body fixed, when in the second position, the retaining member makes the valve body move relative to the inlet pipe in the axial direction; and
   wherein the actuator can slide up and down in the valve body and is connected to the valve body, a driving groove is disposed at the lower end of the actuator to pass through the actuator inside and outside, the retaining member is disposed with a flange coupled to the driving groove;
   wherein at least a row of outer teeth of spaced are disposed in the axial direction at the outer periphery of the inlet pipe; the at least an inner tooth coupled to the outer teeth is disposed at the inner periphery of the valve body or the retaining member, the valve body is fixed to the inlet pipe or moved relatively to the inlet pipe by the cooperation of the inner tooth and the outer teeth;
   wherein the retaining member is rotatable and disposed in the valve body, the inner tooth is disposed at the inner periphery of the retaining member, the actuator slides up and down to drive the retaining member to rotate, making the inner tooth and the outer teeth engaged or separated; and
   wherein the driving groove includes a lower limited groove parallel to the centre line of the inlet pipe and an inclined groove, the lower limited groove is connected to the bottom of the inclined groove.

2. A height adjusting mechanism for an inlet valve according to claim 1, wherein the retaining member further includes a limited block to prevent the actuator from moving in the axial direction, the limited block is fixed to the flange and situated in the exterior of the driving groove.

3. A height adjusting mechanism for an inlet valve according to claim 2, wherein the outer periphery of the valve body is disposed with a first longitudinal guiding rib, two sides of the first guiding rib are respectively disposed with a longitudinal guiding groove, the actuator is disposed with a front side and a back side of opposite to each other, the back side is disposed with two ribs of spaced, two ribs are respectively coupled to the two guiding grooves.

4. A height adjusting mechanism for an inlet valve according to claim 2, wherein further includes location components movably disposed at the lower end of the actuator, the location components include a location button and a first elastic piece, the location button is disposed with a location lock, the valve body or the first guiding rib is disposed with a location groove coupled to the location lock, a throughout hole is disposed at the upper end of the actuator for the location lock to pass through, the first elastic piece is withstood between the location button and the actuator.

5. A height adjusting mechanism for an inlet valve according to claim 1, wherein the outer periphery of the valve body is disposed with a first longitudinal guiding rib, two sides of the first guiding rib are respectively disposed with a longitudinal guiding groove, the actuator is disposed with a front side and a back side of opposite to each other, the back side is disposed with two ribs of spaced, two ribs are respectively coupled to the two guiding grooves.

6. A height adjusting mechanism for an inlet valve according to claim 1, wherein further includes location components movably disposed at the lower end of the actuator, the location components include a location button and a first elastic piece, the location button is disposed with a location lock, the valve body or the first guiding rib is disposed with a location groove coupled to the location lock, a throughout hole is disposed at the upper end of the actuator for the location lock to pass through, the first elastic piece is withstood between the location button and the actuator.

7. A height adjusting mechanism for an inlet valve according to claim 1, wherein a second elastic piece is disposed between the actuator and the valve body to make the actuator repositioned, one end of the second elastic piece is fixed to the valve body, while the other end is fixed to the actuator.

8. A height adjusting mechanism for an inlet valve comprising:
   A valve body;
   An inlet pipe, which is sleeved in the valve body and connected to the valve body;
   A retaining member, is assembled to the valve body; and
   An actuator, which can drive the retaining member to move between a first position and a second position, when in the first position, the retaining member makes the inlet pipe and the valve body fixed, when in the second position, the retaining member makes the valve body move relative to the inlet pipe in the axial direction; and wherein the actuator can slide up and down in the valve body and is connected to the valve body, a driving groove is disposed at the lower end of the actuator to pass through the actuator inside and outside, the retaining member is disposed with a flange coupled to the driving groove;

wherein at least a row of outer teeth of spaced are disposed in the axial direction at the outer periphery of the inlet pipe; the at least an inner tooth coupled to the outer teeth is disposed at the inner periphery of the valve body or the retaining member, the valve body is fixed to the inlet pipe or moved relatively to the inlet pipe by the cooperation of the inner tooth and the outer teeth;

wherein the retaining member is rotatable and disposed in the valve body, the inner tooth is disposed at the inner periphery of the retaining member, the actuator slides up and down to drive the retaining member to rotate, making the inner tooth and the outer teeth engaged or separated.

9. A height adjusting mechanism for an inlet valve according to claim 8, wherein the outer periphery of the valve body is disposed with a first longitudinal guiding rib, two sides of the first guiding rib are respectively disposed with a longitudinal guiding groove, the actuator is disposed with a front side and a back side of opposite to each other, the back side is disposed with two ribs of spaced, two ribs are respectively coupled to the two guiding grooves.

10. A height adjusting mechanism for an inlet valve according to claim 8, wherein further includes location components movably disposed at the lower end of the actuator, the location components include a location button and a first elastic piece, the location button is disposed with a location lock, the valve body or the first guiding rib is disposed with a location groove coupled to the location lock, a throughout hole is disposed at the upper end of the actuator for the location lock to pass through, the first elastic piece is withstood between the location button and the actuator.

11. A height adjusting mechanism for an inlet valve according to claim 8, wherein several first bumps are spaced disposed in an annular at the outer periphery of the lower end of the valve body, the annular groove is disposed at the inner periphery of the retaining member to couple to the first bumps, the retaining member is rotatable and connected to the valve body by the cooperation of the first bumps and the groove.

12. A height adjusting mechanism for an inlet valve according to claim 11, wherein the outer periphery of the valve body is disposed with a first longitudinal guiding rib, two sides of the first guiding rib are respectively disposed with a longitudinal guiding groove, the actuator is disposed with a front side and a back side of opposite to each other, the back side is disposed with two ribs of spaced, two ribs are respectively coupled to the two guiding grooves.

13. A height adjusting mechanism for an inlet valve according to claim 11, wherein further includes location components movably disposed at the lower end of the actuator, the location components include a location button and a first elastic piece, the location button is disposed with a location lock, the valve body or the first guiding rib is disposed with a location groove coupled to the location lock, a throughout hole is disposed at the upper end of the actuator for the location lock to pass through, the first elastic piece is withstood between the location button and the actuator.

14. A height adjusting mechanism for an inlet valve according to claim 8 wherein further includes a float movably disposed in the valve body, the bottom surface and the top surface of the float are respectively disposed with an abdicating groove for the actuator; the actuator is rod shaped, the actuator passes through the abdicating groove and the upper end of the actuator is situated on the top of the float.

15. A height adjusting mechanism for an inlet valve according to claim 14, wherein the outer periphery of the valve body is disposed with a first longitudinal guiding rib, two sides of the first guiding rib are respectively disposed with a longitudinal guiding groove, the actuator is disposed with a front side and a back side of opposite to each other, the back side is disposed with two ribs of spaced, two ribs are respectively coupled to the two guiding grooves.

* * * * *